United States Patent [19]
Stenstrom et al.

[11] Patent Number: 5,046,519
[45] Date of Patent: Sep. 10, 1991

[54] METHOD AND APPARATUS FOR MONITORING A FLUID CONDUIT SYSTEM

[75] Inventors: Theiss Stenstrom; Jens J. Molbaek, both of Nordborg; Poul E. Hyldig, Augustenborg; Bjarne Straede, Sydals, all of Denmark

[73] Assignee: Danfoss A/S, Nordborg, Denmark

[21] Appl. No.: 605,175

[22] Filed: Oct. 29, 1990

Related U.S. Application Data

[63] Continuation of Ser. No. 479,052, Feb. 12, 1990, abandoned.

[30] Foreign Application Priority Data

Feb. 18, 1989 [DE] Fed. Rep. of Germany ....... 3905054

[51] Int. Cl.$^5$ .............................................. F16K 21/00
[52] U.S. Cl. ................................. 137/1; 137/487.5; 137/624.11; 73/40.5 R
[58] Field of Search ...................... 137/624.11, 624.12, 137/495, 487.5, 1, 14; 73/40.5 R

[56] References Cited

U.S. PATENT DOCUMENTS

| | | | |
|---|---|---|---|
| 4,180,088 | 12/1979 | Mallett | 137/486 X |
| 4,249,565 | 2/1981 | Brust | 137/624.11 X |
| 4,589,435 | 5/1986 | Aldrich | 137/624.12 X |
| 4,870,661 | 2/1989 | Lewis | 137/624.12 X |
| 4,911,200 | 3/1990 | Ben-Arie | 137/624.12 X |

Primary Examiner—Alan Cohan
Attorney, Agent, or Firm—Wayne B. Easton; Clayton R. Johnson

[57] ABSTRACT

The method and apparatus is directed to monitoring a fluid conduit system for leaks, particularly a leakage flow of less than 25 liters per hour. After closing a main valve that fluidly connects a fluid source to the conduit system, the time is measured for the pressure in the conduit system to drop to a predetermined first value. Upon reaching the first value a shunt valve is opened and the time is measured for the pressure to rise to a second predetermined value. The leakage flow is calculated from the two measured times and the two pressures together with known constants for the control system. In place of providing the shunt valve the main valve may be partially opened. Controls for the valves are provided together with evaluating apparatus for determining the leakage volume.

20 Claims, 2 Drawing Sheets

Fig.1

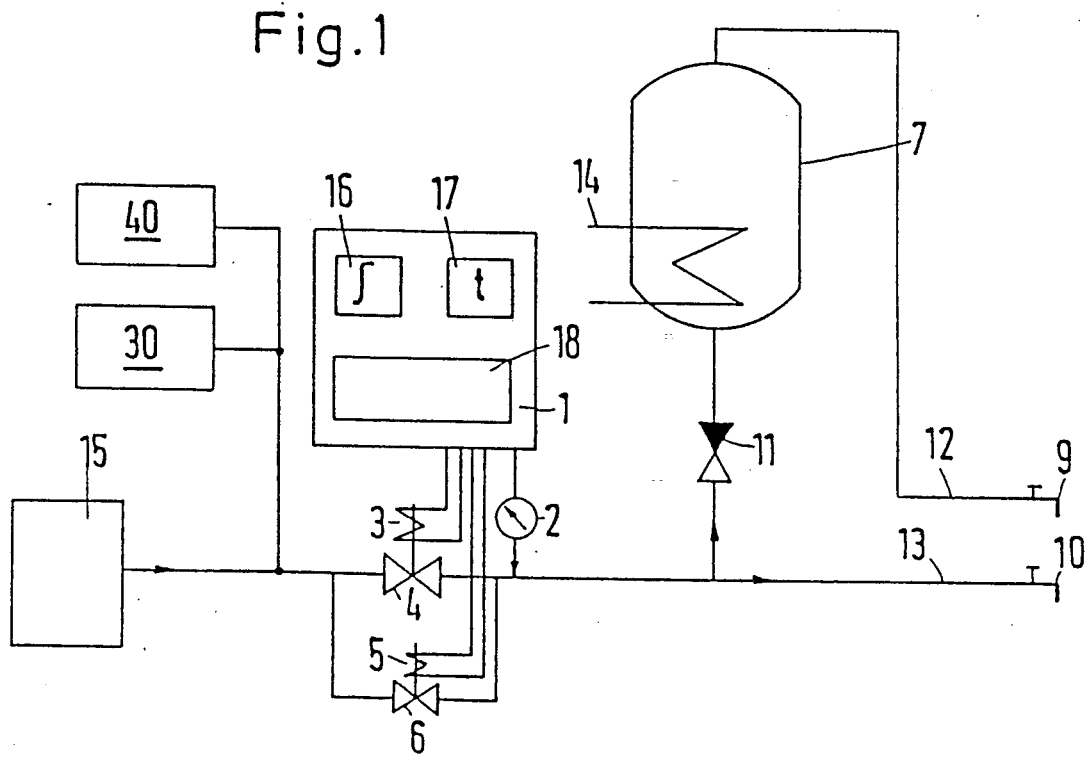
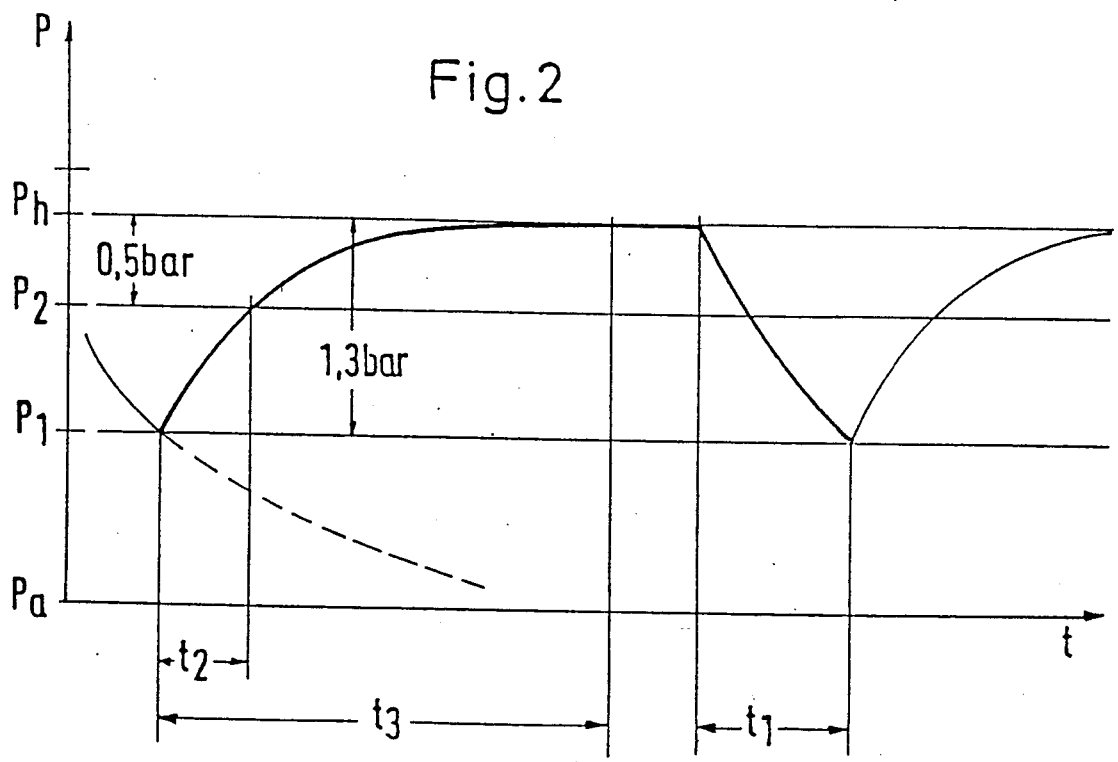

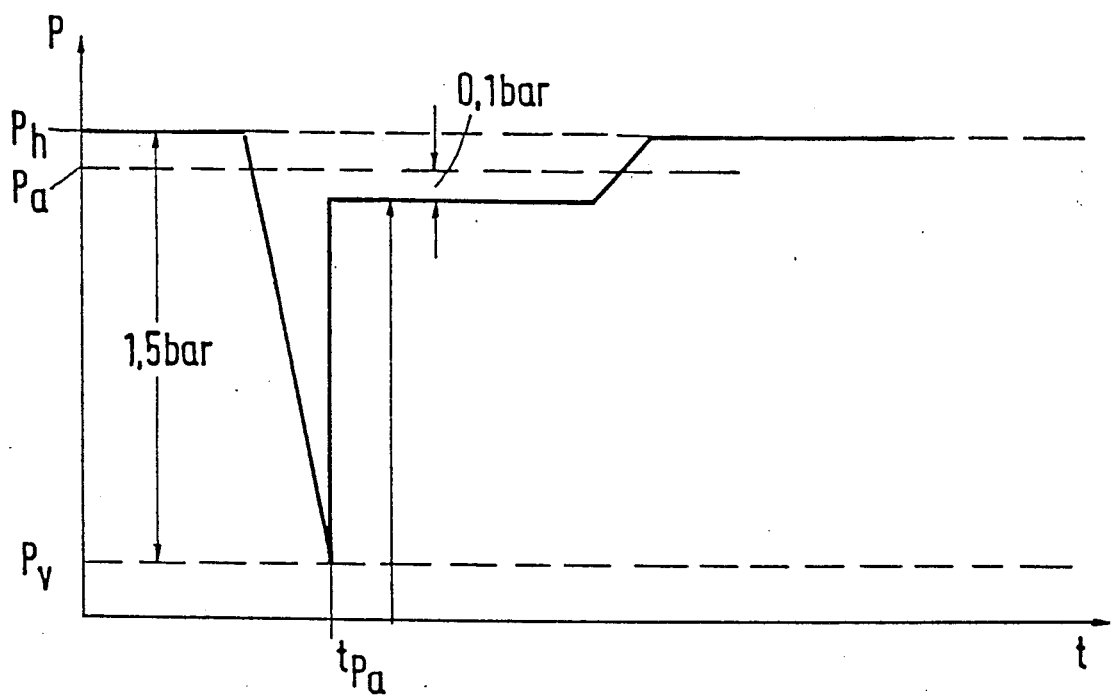

METHOD AND APPARATUS FOR MONITORING A FLUID CONDUIT SYSTEM

This is a continuation of application Ser. No. 07/479,052 filed Feb. 12, 1990, now abandoned.

The invention relates to a method of monitoring a fluid conduit system for leaks, the system comprising a main supply closable by a main valve, wherein, during a period when no fluid is being withdrawn from the conduit system, the main valve is closed, the pressure downstream of the main valve is measured permanently and, after the pressure has dropped to a predetermined first value, fluid is replenished. Further, the invention relates to an apparatus for monitoring a fluid conduit system for leaks, comprising a main valve which separates the conduit system from a fluid source, a pressure meter downstream of the main valve and a control apparatus for the main valve.

Conduit systems for fluids have to be monitored for escapes and for leakages. This is fundamentally so for all conduit systems, regardless of whether they serve to convey mains water into the house, heating fluid in heating and remote heating systems or gases or fuel in distribution circuits.

In particular, the monitoring of mains water circuits in buildings has assumed an increasing importance in recent years. The problem will be explained by way of example with reference to a mains water installation in a residential building.

Normally, the consumption of water when a consumer takes water from a water tap amounts to between about 50 and 1,500 l/h. In extreme cases, such as the cisterns of water closets or a washing machine, it may also be around 30 to 2,500 l/h. Leakage points caused by a pipe fracture or bursting of a supply hose for a washing machine or a dishwasher usually account for from 500 to 2,500 l/h and in some cases higher and can therefore not be distinguished from normal consumption. Consequently, in the case of such high volumes above a predetermined value, the supply of water is interrupted after a maximum withdrawal time, regardless of whether there is consumption or a large leak.

A distinction must be made with defects which will hereinafter be referred to as a "small leak". The loss of water is here somewhat in the region of 1 to 25 l/h and can be caused on the one hand by dripping water taps and overflowing toilet cisterns and on the other hand by untight pipe connections, the start of fatigue failures in pipes on account of corrosion, hair cracks in pipes and vessels or like faults in the conduit system. Whereas the first group of examples may not be directly dangerous but only increase the costs for fresh water and drainage and thereby impose a strain on the environment and drinking water resources, small leaks of the second kind can cause severe damage. The outflowing amount of 1 to 25 l/h may appear very low but, over a prolonged period it can cause intensive dampness in walls or other parts of the building that will no longer be repairable. The resulting damage is often detected too late because dampness starts on the inside of a wall and becomes visible only when the entire wall is already damp. On the other hand, If one were to detect such a small leak in time, one could search for it and repair it. One generally has to prize the wall open for this purpose but the expenditure is less than if the whole wall has to be renewed because of saturation. Where permissible, for example in remote heating installations, one can try to seal the fault in the conduit system by introducing a sealing mass with the mains water.

WO 86/06457 discloses a method and apparatus in accordance with the present classification. A pressure meter monitors the pressure in the conduit system downstream of the main valve. Upon a pressure drop below a predetermined value, the main valve is opened and fluid can enter the conduit system. A predetermined time after opening the main valve, it is closed again. If fluid continues to be withdrawn or there is a large leak, the pressure meter will register another pressure drop during a predetermined period after closing the main valve and it will open the main valve again. This leads to unpleasant pressure pulses when water is withdrawn by the consumer. If there is no sudden pressure drop, it is assumed that there is no longer any consumption and the main valve remains shut. Should there be a small leak, the pressure in the conduit system drops gradually from the supply pressure to a predetermined test pressure. After closing of the main valve, a testing period is therefore started and one controls whether or not the pressure still lies above the test pressure after expiry of the testing period. If the pressure is still considerably above the test pressure after expiry of the testing period, testing is interrupted and the conduit system is declared to be leakproof. In other cases, the main valve is locked in the closed condition. However, the source of fluid, for example the mains from a waterworks, can produce strong pressure fluctuations of about 1.2 bar which are balanced out again within five to ten minutes. Another problem is caused by other consumers who suddenly withdraw very much fluid in the vicinity of the conduit system to be monitored. When introducing such a neibouring consumer, the pressure at the inlet to the conduit system to be monitored can drop by up to 0.6 bar whereas it can rise momentarily by 0.4 bar when shutting down. For this reason, the absolute measurement of pressure is not sufficient to obtain more accurate information about the leak. Also, every conduit system has its own elasticity which can be very different from the elasticity of other conduit systems, so that the pressure drop as caused by a leak can be different from one conduit system to the next. This is not taken into account in the known system. In addition, the known system only permits one to detect that a leak is present but not the size of the leak. However, such information is very valuable for the measure that is to be taken. In addition, the known system does not take into account that the hot water part of a conduit system has a different elasticity from the cold water part. On the one hand, this is because the hot water part contains a hot water vessel or preparer the walls of which are large and can yield within certain limits. On the other hand, air that was introduced during preparation of the water by the waterworks is excluded from the water in the hot water part. For this reason, different measurements are obtained for a leak and these depend on the part where the leak is located.

It is the problem of the present invention to provide a method and apparatus with which a conduit system can be monitored for leaks and the size of the leak can be determined.

This problem is solved in a method of the aforementioned kind in that a first time is measured during which the pressure in the conduit system drops from the maximum pressure directly after blocking the supply of fluid to the first value, that, during replenishment, a second time is measured during which the pressure in the conduit system rises from the first value to predetermined second value, and that the leakage volume is calculated from the first and second pressures and a constant for the conduit system.

This not only detects whether a leak is present but an investigation is also made of the size by determining the leakage volume. This is achieved by not only determining whether the time required for a pressure drop lies within or outside certain limits but by actually measuring two times, namely the time during which only fluid flows from a leak and a second time during which the conduit system is replenished again. By measuring the time course of the pressure, very concrete conclusions can then be drawn about the outflowing volume of fluid and the speed through the leak.

In a preferred embodiment, the fluid is replenished through a closable replenishing path with a volume which is considerably less than the volume through the main supply path during withdrawal of the fluid. One thereby achieves a relatively slow pressure rise in the conduit system to be monitored and this is much flatter than the pressure rise that would occur if the main valve had been fully opened during replenishment. The lower pressure rise thus achieved in the time permits a much more accurate time resolution so that one can thereby determine the volume with higher accuracy than would be the case with a steeper pressure rise.

In particular, it is preferred that the volume of the replenishing fluid is at least as much as the largest volume for a small leak. The replenishing flow preferably has the same order of size as the leakage volume. With a medium leakage volume, the time required by the pressure to drop to the predetermined first value and the time required by the pressure to rise to the predetermined second value are therefore of the same order. This simplifies the further processing of the determined times and reduces the total error necessitated by errors in measurement. Nevertheless one ensures that, even in the case of the largest possible leakage volume permissible for a small leak, replenishment is still possible because the replenishing volume is larger than the small leak volume. Preferably, the replenishing volume is about four to eight times as large as the largest small leak volume.

Advantageously, the leakage volume is calculated according to the following formula $$V = \frac{K \sqrt{P_2 - P_1}}{(t_1/(nt_2))(t_1/(nt_2) + 2)}$$

wherein V is the leakage volume, $P_1$ is the predetermined first lower pressure, $P_2$ is the predetermined second higher pressure, $t_1$ is the first time, $T_2$ is the second time, K is a combined expression for conduit system constants and n is a value depending on the ratio of $P_2$ to the highest pressure. The pressure drops from a maximum, which is somewhat less than the pressure of the mains supply, to the lower pressure which is, for example, 1.3 bar below the maximum pressure. The time $t_1$ necessary for this is measured. The highest pressure lies slightly below the pressure of the fluid source because the leakage volume causes a small pressure drop in the replenishing path. After reaching the lower pressure $P_1$, replenishment takes place through the replenishing path. Basically, one could monitor the time course of the pressure drop and pressure rise and, after determining the respective function, obtain an indication about the leakage volume. It is simpler to measure the time required by the pressure to reach its old value again. However, since this time is influenced too much by the pressure fluctuations in the feeding mains, i.e. the fluid source, one simply measures the second time $t_2$ to reach the second and higher pressure $P_2$. One thereby utilizes the fact that the pressure rise between $P_1$ and $P_2$ is close to linear. The time that the pressure would now theoretically require to return to its old maximum value depends on the ratio between the second and upper pressure $P_2$ and the maximum pressure. This old value is n times the second time $t_2$. The volume can be determined relatively accurately with the stated formula.

Advantageously, the second pressure $P_2$ is about 63% of the maximum pressure and n=5. Up to the stated value, it is a good approximation to assume that the pressure rise is quasi linear.

Preferably, the second time is measured only as long as the pressure change throughout the time is positive. This eliminates short pressure drops caused by the withdrawal of fluid in neighboring conduit systems. Pressure fluctuations are thereby balanced out.

Preferably, replenishment of the fluid is continued over a third time which is at least n times the second time. Thus, replenishment is continued until the original pressure value has been reached again or until the maximum possible pressure has been reached with the pressure obtaining in the mains. In this way, always the same pressure values are available for repeated measurements.

Preferably the main valve is opened upon a sudden drop in the pressure below the first value with the supply blocked. This sudden drop is an indication of consumption or a large leak. As hereinbefore explained, the method cannot at this stage distinguish between consumption and a large leak. However, in the large majority of cases it will be consumption, so that the main valve opens to make adequate fluid available to the consumer.

Advantageously, the main valve remains open until either the pressure downstream of the main valve rises to a value which lies by a predetermined difference above a starting pressure such as that shown in FIG. 3 that has obtained in the conduit system during a predetermined dead period after opening of the main valve, or until a maximum withdrawal period has been exceeded. In this way, the method also permits the damage caused by a large leak to be kept small. The main valve closes at the end of one consumption, the criterion being the pressure rise above a threshold value. As a base value for this pressure rise, one uses the pressure, termed the starting pressure, which has obtained in the conduit system during a predetermined dead period, for example 2 seconds, after opening of the main valve. This is intended to eliminate pressure fluctuations which necessarily occur in the conduit system after opening of the main valve. This pressure rise enables one to recognise reliably that the user has chosen a setting for the withdrawal of fluid from the conduit system. However, if it is determined that the withdrawal of fluid is taking too long, there is the danger that a leak is present. For this reason, the maximum withdrawal period is limited so that, even in the presence of a large leak, the amount of escaping fluid can be limited to a maximum value.

Preferably, the main valve closes at predetermined time intervals less than the maximum withdrawal period and the replenishing path is opened. During a pressure drop period after opening of the replenishing path, the pressure is checked as to whether it drops by a predetermined second difference and, upon a drop of the pressure by the predetermined second difference during the pressure drop period, the main valve is opened and the replenishing path is closed, the pressure immediately prior to closing of the main valve being stored to serve as the new starting pressure. It can easily happen that the feeding pressure drops during the withdrawal period so that, even at the end of withdrawal of fluid by the consumer, it is not possible for the pressure to rise to a value which lies above the starting pressure by the required amount. The only criterion would then be the maximum withdrawal period, the main valve and the replenishing path being locked in the closed position at the end of the withdrawal period. Repeated withdrawal of the fluid, even if intentional, would then be impossible. The preferred construction would, however, make it possible for the feed pressure, i.e. the pressure of the fluid source, as it were to follow so as always to have a closing criterion which can actually be achieved. Simultaneous opening of the replenishing path during closure of the main valve brings about a pressure drop which can be measured and used to determine whether or not the consumer is still withdrawing fluid. On the other hand, the resulting pressure shocks set up at the location of the consumer are considerably damped and he will practically not notice them any more.

Advantageously, the main valve opens for a predetermined short period a predetermined delay period after closure of the main valve after expiry of the maximum withdrawal period and the pressure in the conduit system is compared with a third value which lies a predetermined third difference above the pressure value directly prior to closing of the main valve, the main valve being opened again when the pressure has exceeded the third value. When consumption is to be resumed, the consumer momentarily closes the tapping point in order to give a signal that there is no large leak. When there is a large leak, it is most unlikely that there will be a momentary pressure rise just at the crucial time to cause the main valve to open again.

It is also an advantage to integrate the leakage volume over time and thereby determine the amount of leakage. To determine a leak that might be present in a conduit system, one thereby has available not only the instantaneous leakage volume but also the quantity that has left through the leak. As was explained at the outset, even with a small leakage volume that is in itself of little concern the building might be endangered if the total amount of escaping fluid is too large.

To warn the user, upon reaching a determined amount of leakage that is larger than a predetermined first amount, an indicator is actuated. The user can thereupon examine all the tapping points to see whether there Is an untight seal. Often, the user has merely forgotten, for example, to close a tap properly, which therefore drips. Upon release of the alarm, he can then close the tap or, if he does not find a dripping tap, introduce suitable means into the conduit system for sealing small leaks.

Advantageously, the integrator is reset and will integrate the amount of leakage anew when the leakage volume drops below a predetermined first value. This is of particular advantage when, as described above, the user has merely forgotten to close a water tap. After closure of the tap, the leakage volume decreases. A leak up to then correctly detected by the apparatus has then been "repaired". Measurement will then advantageously start from new again to examine whether further leaks are present.

However, with a leakage volume larger than the first value, the main valve and the replenishing path are locked in the closed condition when the amount of leakage exceeds a predetermined second value. In that case, not only a critical leakage volume has flowed out of the leak without control but a large amount of fluid has already flowed out of the leak so that there is a danger to the surroundings. To avoid further damage, closure of the main valve and the replenishing path prevents the further entry of fluid into the conduit system and from there into the surroundings.

In an apparatus of the aforementioned kind, the problem is solved in that provision is made for a replenishing path through which the fluid can flow into the conduit system after dropping of the pressure by or to a predetermined first value after blocking the supply of fluid from the source, time measuring means which measure a first time required by the pressure to drop by or to the first value after the supply of fluid has been blocked and a second time required by the pressure after opening of the replenishing path to rise from the first pressure to a predetermined second pressure, and evaluating means which determine the volume of the leak from the first and second pressure values, the first and second time and the constant of the conduit system. The apparatus therefore contains the components required to detect the values of pressure and time required for the calculation.

Advantageously, the replenishing path comprises a shunt valve in parallel to the main valve. The shunt valve bridges the main valve and allows a volume of fluid flow that is dimensioned according to the requirements of the conduit system to be monitored.

In another preferred embodiment, the replenishing path leads through the main valve which, for replenishment purposes, frees only a part of the opening cross-section of the valve. Although this complicates the control of the main valve, fewer connecting points and no additional valve are required.

Preferably, the replenishing path only permits a volume to pass that is of the same order as the largest small leak volume. This gives a relatively good time resolution which facilitates determination of the leakage volume.

Advantageously, the replenishing path permits a maximum of 50 l/h to pass. This is double the maximum that can be reached by a small leak. Even in the case of a small leak which loses a leakage volume equivalent to the maximum permissible for a small leak, replenishment will still he possible. On the other hand, the time constants for replenishing the conduit system and for lowering the pressure are of the same order of size, so that further processing would be relatively simple.

Advantageously, an integrator !s employed which integrates the leakage volume over time. This integrator is preferably contained in the control apparatus for the main valve, which control apparatus in any case receives through the pressure meter the information necessary for determining the leakage volume, in order to open or close the main valve, so that practically no additional processing of the measurements is required.

In a preferred embodiment, an alarm is provided which, depending on the flow of leakage volume and/or the escaping amount of leakage releases an alarm and/or locks the main valve and the replenishing path in the closed condition. When dimensioning the control apparatus, provision can be made at will to ensure that sudden leakage volume flows must not be exceeded and/or certain amounts of leakage must not escape without an alarm being released and/or the supply of fluid to the conduit system to be monitored being shut off.

A preferred example of the invention will now be described with reference to the drawing, wherein:

FIG. 1 is a diagramatic representation of a conduit system to be monitored,

FIG. 2 is a diagramatic representation of the pressure course in a conduit system in the case of a small leak, and FIG. 3 is a diagramatic representation of the pressure course during consumption.

The example illustrates the water conduit system in a residential building to which mains water is supplied from a source 15, for example the mains from a waterworks. At the inlet to the building, the water conduit system is closed by a main valve 4 which can be remote controlled by a control apparatus 1 and actuated by an actuating element 3. Downstream of the main valve there is a pressure meter 2 which transmits to the control apparatus 1 the conduit pressure existing downstream of the main valve. Downstream of the pressure meter 2, a cold water conduit 13 leads to a cold water tap 10. A hot water supply conduit branching off from the cold water conduit 13 leads through a check valve 11 into a hot water vessel 7 in which there is a heating apparatus 14. From the hot water vessel 7, a hot water conduit 12 leads to a hot water tap 9.

Between the source 15 and main valve 4, a conduit branches off for the mains water supply 30, 40 of two neighboring houses.

Parallel to the main valve 4, there is a replenishing path comprising a shunt valve 6 which can likewise be actuated by the control apparatus 1 by way of an actuating element 5. The replenishment path has a much lower capacity than the path through the main valve 4. For example, whereas up to 2,500 l/h can flow through the main valve 4, no more than 50 l/h can flow through the shunt valve 6.

The control apparatus 1 comprises time measuring means 17 which are set into operation on exceeding or falling below a pressure in the conduit system, and evaluating means 18 which, from the pressure values determined by the pressure meter 2 and the time values determined by the time measuring means 17, determine the volume escaping from the conduit system without water being withdrawn from the tapping points 9, 10. In FIG. 2, the course of the pressure in the conduit system downstream of the main valve 4 is illustrated diagramatically for the case where no water is withdrawn by the consumer and water flows out only from a small leak. After closing the main valve 4 and shunt valve 6, i.e. after blocking the total supply of fluid, in the case of a leak in the conduit system, the pressure drops from a value $P_h$ to a value $P_1$ and requires a time $t_1$ to do so. If there is a leak, pressure $P_h$ is slightly less than the feed pressure from the waterworks because a small pressure drop caused by the flow created by the leak is created at the supply valve, i.e. at the main valve 4 or shunt valve 6. After the pressure has dropped to the lower value $P_1$, the shunt valve opens and the pressure rises again to the original value $P_h$, for which the time $t_3$ is required. Since the pressure rise or pressure drop always depends on the difference between the pressure in the conduit system and the feed pressure from the waterworks 15, the illustrated e-function is obtained. On commencement of each section, it is a good approximation to assume that the pressure change is linear, for example during the increase between $P_1$ and $P_2$ at the associated times $t_1$ and $t_2$.

In the knowledge of the constants for the conduit system and the determined pressure course, the volume that has flowed through the leak and the flow of volume can be calculated with the aid of known equations. However, it has been found that a satisfactory indication of the volume V can be obtained with good approximation even by considering only the "linear" section of the pressure rise. This volume is calculated with the aid of the formula $$V = \frac{K\sqrt{P_2 - P_1}}{(t_1/(nt_2))(t_1/(nt_2) + 2)}$$

In this formula, $t_2$ is the time for which the pressure $P_2$ exists in the system again. This prevents pressure fluctuations in the feeding mains from making the determination of the value $t_3$ difficult or even impossible. Even when the final pressure is higher or less than $P_h$, the increased time $t_2$ is only slightly influenced in the linear zone. The factor n must be chosen so that $n \cdot t_2$ corresponds at least to the value $t_3$, i.e: one must ensure that the pressure in the conduit system after opening of the shunt valve 6 returns to its original value or at least reaches the maximum possible value.

As will be evident from FIG. 2, the times $t_2$ and $t_1$ are of the same order. In the illustrated example, $t_1$ is about twice $t_2$.

The pressure course illustrated in FIG. 2 serves to determine small leaks. The pressure course shown in FIG. 3 is for detecting consumption or a large leak. When the consumer opens one of the taps 9, 10, the pressure in the conduit system drops from a value $P_h$ to a value $P_v$, which may be, say, 1.5 bar below $P_h$. By way of the pressure meter 2, this is signalled to the control apparatus 1 which opens the main valve 4 by way of the actuating element 3. The pressure now rises again, unavoidable pressure fluctuations being noticeable during the rise. A predetermined time $t_{Pa}$ after opening of the main valve 4, a pressure is therefore determined that will hereinafter be referred to as the "starting pressure". As long as the consumer withdraws water from the water taps 9, 10, the starting pressure is maintained. When consumption terminates, the pressure in the conduit system exceeds the starting pressure because the waterworks 15 continue to supply water whilst no water is being withdrawn. A criterion for closing the main valve is fulfilled when the pressure in the conduit system rises to 0.1 bar above the starting pressure. If this so called shut down pressure $P_a$ has been reached, the control apparatus 1 closes the main valve 4 and the supply of water is stopped.

If there were no defects, the above-mentioned conditions would suffice for providing a reliable indication as to whether there is consumption or whether it has already finished. Because of the fluctuations in the supply pressure, which may be momentary or prolonged, the stated criterion is not, however, sufficient for reliably determining completion of consumption. For example, if the supply pressure of the motor pump 8 drops during consumption or if a neighboring conduit system 30, 40 that is likewise fed by the waterworks 15 requires water, the shut down pressure in the conduit system to be monitored can no longer be reached, even when consumption has terminated. Consequently, the control apparatus can no longer determine when consumption has ended, so that the main valve 4 remains open even if there are pauses between individual consumer situations. For this reason, the control apparatus regards a chain of separate consumer situations as a single consumption for which the main valve 4 is to be kept open, so that a maximum withdrawal period is exceeded. This maximum withdrawal period is so dimensioned that a consumer may, for example, fill a bath or have a generous shower. For example, it can amount to 15 minutes. When the withdrawal period is exceeded, the control apparatus 1 locks the main valve 4 and the shunt valve 6 in the closed position.

To prevent the control apparatus 1 on expiry of the maximum withdrawal period from preventing all further withdrawal of water from the conduit system, the control apparatus will attempt a trial closure at the main valve for example once every 40 seconds. Whilst the main valve is closed, the shunt valve is opened. During a pressure drop period of, say, 2 seconds following closure, a measurement is taken as to whether or not the pressure is dropping. If the pressure during this pressure drop period does not fall by 0.2 bar, consumption has terminated and the shunt valve 6 is therefore likewise closed. The withdrawal period so far determined by the time measuring means 17 are reset to zero and the last pressure measured Is stored as the new pressure $P_h$ for performing a leakage quantity test.

However, if the pressure drops by 0.2 bar during the pressure drop period, the consumption had not yet terminated. The main valve 4 therefore opens very rapidly and the shunt valve 6 is closed. The pressure that had obtained in the conduit system immediately prior to the trial closure is then utilized to form a new limiting value, i.e. a new starting pressure, for the end of consumption. The new criterion for the end of consumption is given when the pressure in the conduit system lies 0.1 bar above the last measured starting pressure. The pressure in the conduit system is therefore always re-established or made to follow the feed pressure so that a reliable indication of the end of consumption is obtained each time. By reason of the fact that the shunt valve is opened whilst the main valve is closed, one prevents excessive amplification of the pressure pulses normally created in the conduits 12, 13 by closing of the main valve 4. The amount of water replenished through the shunt valve 6 is not very large but it considerably damps the pressure pulses so that they are no longer regarded as objectionable by the consumer.

If the pressure rises during consumption because the pressure from the waterworks 15 rises or because the consumption in a neighboring that likewise takes water from the waterworks 15 terminates, the shut down pressure $P_a$ can also be exceeded without the consumption actually having terminated in the circuit being monitored. This situation can also be obtained by momentary pressure pulses which can arise from time to time for various reasons in the mains from the waterworks. For this reason, the condition under which the control apparatus detects the end of consumption and shuts the main valve is that during a control period of, say, 10 seconds at least 70% of the pressure measurements were lying above the shut down pressure $P_a$. This reduces the number of wrong closures that can be caused by pressure oscillations. When the above-mentioned condition has been fulfilled, the main valve 4 is closed and the shunt valve is opened. Thereafter, the pressure is again tested during the pressure drop period to see whether it drops by 0.2 bar in the conduit system to be monitored. If this is the case, the consumption had not yet terminated. The main valve is opened and the shunt valve 6 is closed. The previously determined shut down pressure $P_a$ is now increased by a predetermined value, for example 0.2 bar, i.e. the condition for closing of the main valve 4 is that the pressure lies above the pressure $P_a+0.2$ bar. Since pressure monitoring by the control apparatus in this way follows the feed pressure, one ensures that the end of consumption is reliably detected every time and the main valve can therefore be closed.

If there is no consumption but a large leak, the control apparatus 1 closes the main valve 4 by way of the valve actuation 3 at the end of a maximum withdrawal period. This prevents an excessive amount of leakage fluid from escaping in the case of a large leak and causing more extensive damage.

Now, it is possible to encounter situations in which the consumer requires water over a prolonged period, for example to wash his car or water the garden. To permit prolonged withdrawal of water, the consumer may actuate a pressure switch to signal to the control apparatus that during the next period of consumption there should be a longer maximum withdrawal period of, say, two hours. However, it is simpler for the control apparatus to close the main valve at the end of the withdrawal period for a predetermined short time, for example 5 seconds, and then open it again. If the pressure after opening within a further predetermined period of, for example, 10 seconds now rises by 0.1 bar above the pressure shortly before closing, this is an indication of the fact that the user has signalled the control apparatus 1 that there is no large leak by closing the tap 9, 10. The time measuring means 17 are then reset to zero, so that the maximum withdrawal period starts afresh. Thus, to extend the maximum withdrawal period, it is merely necessary for the consumer to close the water tap 9, 10 momentarily when he notices that the pressure is waning during withdrawal of the water, thereby signalling to the control apparatus 1 that there is no large leak but rather consumption.

If at the end of the maximum withdrawal period the consumer does not give a signal to the control apparatus 1, the latter assumes that there is a large leak. The main valve 4 and the shunt valve 6 are locked in a closed position and an alarm is released or a display apparatus is actuated. The supply of water can be opened again merely by actuating a reset arrangement at the control apparatus 1. This is to prevent water from starting to flow again without having repaired the large leak.

What is claimed:

1. A method of monitoring a fluid conduit system for leaks, the system comprising a main supply closable by a main valve, wherein, during a period when no fluid is being withdrawn from the conduit system, the main valve is closed, the pressure downstream of the main valve is measured permanently and, after the pressure has dropped to a predetermined first value, fluid is replenished, characterised in that a first time is measured during which the pressure in the conduit system drops from the maximum pressure directly after blocking the supply of fluid to the first value, that, during replenishment, a second time is measured during which the pressure in the conduit system rises from the first value to a predetermined second value, and that the leakage volume is calculated from the first and second pressures and a constant for the conduit system.

2. A method according to claim. 1, characterised in that fluid is replenished through a closable replenishment path with a volume through the main supply during withdrawal of fluid.

3. A method according to claim 1, characterized in that the fluid is replenished with a volume at least as large as the largest small leak volume.

4. A method according to claim 1, characterized in that the leakage volume (V) is calculated according to the following formula $$V = \frac{K\sqrt{P_2 - P_1}}{(t_1/(nt_2))(t_1/(nt_2) + 2)}$$

wherein $P_1$ is the predetermined first and lower pressure, $P_2$ is the predetermined second and upper pressure, $t_1$ is the first time, $t_2$ is the second time, K is combined expression for the constants of the conduit system and n is a value depending on the ratio of $P_2$ to the maximum pressure.

5. A method according to claim 4, characterized in that the second time ($t_2$) is measured only as long as the pressure change throughout the time (dP/dt) is positive.

6. A method according to claim 4 wherein $P_2$ is approximately 63% of the maximum pressure and n=5.

7. A method according to claim 6, characterized in that the replenishment of fluid is continued for a third time which is at least n times the second time.

8. A method according to claim 1, characterized in that the main valve is opened if there is a sudden drop in pressure below the first pressure with the supply shut off.

9. A method according to claim 8, characterized in that, after opening, the main valve remains open until either the pressure downstream of the main valve rises to a value which exceeds by a predetermined difference a starting pressure that had been obtained in the conduit system during a predetermined dead period after opening of the main valve, or a maximum withdrawal period has been exceeded.

10. A method according to claim 9, characterized in that at predetermined time intervals smaller than the maximum withdrawal time, the main valve is closed and the replenishing path is opened, the pressure is thereupon checked during a presssure drop period as to determine if it drops by a predetermined second pressure difference and, upon drop in pressure by the predetermined second difference during the pressure drop period, the main valve is opened and the replenishing path is closed, the pressure obtained immediately prior to closing the main valve is stored as a new starting pressure.

11. A method according to claim 10, characterized in that a predetermined delay period after closure of the main valve after expiry of the maximum withdrawal period, the main valve opens for a predetermined short period and the pressure in the conduit system is compared with a third valve which lies a predetermined third difference above the pressure directly before closing of the main valve, the main valve being opened again when the pressure has exceeded the third value.

12. A method according to claim 1, characterized in that the leakage volume is integrated over time so as to determine the amount of leakage.

13. A method according to claim 12, characterized in that an indicator is actuated on reaching an amount of leakage that is larger than a predetermined first amount of leakage.

14. A method according to claim 12, characterized in resetting the integrator and then integrating the amount of leakage when the flow of leakage volume drops below a preselected first value.

15. A method according to claim 12, characterized in that upon a flow of leakage volume larger than the first value, the main valve and the replenishing path are locked in closed conditions when the quantity of leakage exceeds a predetermined second quantity.

16. Apparatus for performing a method of monitoring a fluid conduit system for leaks, the system comprising a main supply closable by a main valve, wherein, during a period when no fluid is being withdrawn from the conduit system, the main valve is closed, the pressure downstream of the main valve is measured permanently and, after the pressure has dropped to a predetermined first value, fluid is replenished, characterized in that a first time is measured during which the pressure in the conduit system drops from the maximum pressure directly after blocking the supply of fluid to the first value, that, during replenishment, a second time is measured during which the pressure in the conduit system rises from the first value to a predetermined second value, and that the leakage volume is calculated from the first and second pressures and a constant for the conduit system, said apparatus comprising a fluid source, a conduit system, a main valve fluidly connecting the conduit system to the fluid source, a control system for the main valve, a pressure meter connected to the conduit system downstream of the main valve, replenishing path means for conducting fluid into he conduit system downstream from said main valve after the dropping of the pressure in the conduit system to a predetermined first value after the main valve has blocked fluid flow from the source to the conduit system, time measuring means for measuring a first time that is required for the dropping of pressure to the first value after blocking the supply of fluid and second time required by the pressure, after the opening of the replenishing path means, to rise from the first pressure to a predetermined second the first and second pressure values, the first and second tie and constants for the conduit system.

17. The apparatus of claim 16 wherein the replenishing path means comprises a shunt valve connected in parallel to the main valve.

18. The apparatus of claim 16 wherein the replenishing path means comprises the main valve having a partially opening position.

19. The apparatus of claim 16 wherein the replenishing path means comprises means for permitting fluid flow of a volume in the order of the size of a predetermined largest small leakage volume.

20. The apparatus of claim 16 wherein the replenishing path means comprises means for permitting fluid flow of a maximum of about 50 liters per hour.

* * * * *